United States Patent
Oosawa

(10) Patent No.: US 10,026,286 B2
(45) Date of Patent: *Jul. 17, 2018

(54) NETWORK CAMERA

(71) Applicant: SonyCorporation, Tokyo (JP)

(72) Inventor: Katsumi Oosawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,334

(22) Filed: Dec. 29, 2016

(65) Prior Publication Data

US 2017/0116834 A1    Apr. 27, 2017

Related U.S. Application Data

(63) Continuation of application No. 12/496,673, filed on Jul. 2, 2009, now Pat. No. 9,565,341.

(30) Foreign Application Priority Data

Jul. 9, 2008 (JP) .................................. 2008-179556

(51) Int. Cl.
*G08B 13/196* (2006.01)

(52) U.S. Cl.
CPC ... *G08B 13/1963* (2013.01); *G08B 13/19656* (2013.01); *G08B 13/19665* (2013.01)

(58) Field of Classification Search
CPC ............ H04N 5/23206; G08B 13/1963; G08B 13/19656; G08B 13/19619
See application file for complete search history.

(56) References Cited

U.S. PATENT DOCUMENTS

| 6,268,882 | B1 | 7/2001 | Elberbaum | |
| 7,057,643 | B2* | 6/2006 | Iida | H04N 5/23203 348/169 |
| 7,464,215 | B2* | 12/2008 | Kawai | H04N 1/00347 348/207.11 |
| 2001/0043271 | A1 | 11/2001 | Kawano | |
| 2002/0149672 | A1* | 10/2002 | Clapp | H04N 7/142 348/14.09 |
| 2004/0004671 | A1 | 1/2004 | Takahashi | |
| 2005/0044258 | A1 | 2/2005 | Nakamura | |
| 2006/0055791 | A1* | 3/2006 | Morino | H04N 1/00214 348/211.2 |

FOREIGN PATENT DOCUMENTS

| JP | 2004 363937 | 12/2004 |
| JP | 2005-26866 | 1/2005 |
| JP | 2005 123796 | 5/2005 |
| JP | 2005 260540 | 9/2005 |
| JP | 2007 274215 | 10/2007 |

* cited by examiner

*Primary Examiner* — Ahmed A Berhan
(74) *Attorney, Agent, or Firm* — Huag Partners LLP; William S. Frommer

(57) ABSTRACT

A network camera includes: a camera main unit including an image sensor unit and a movable portion having a motor for swiveling the image sensor unit; and a base unit, connected detachably to the camera main unit and fixed to a camera installation surface, the base unit having a nonvolatile memory for storing network operation information including network setting information unique to the network camera.

4 Claims, 6 Drawing Sheets

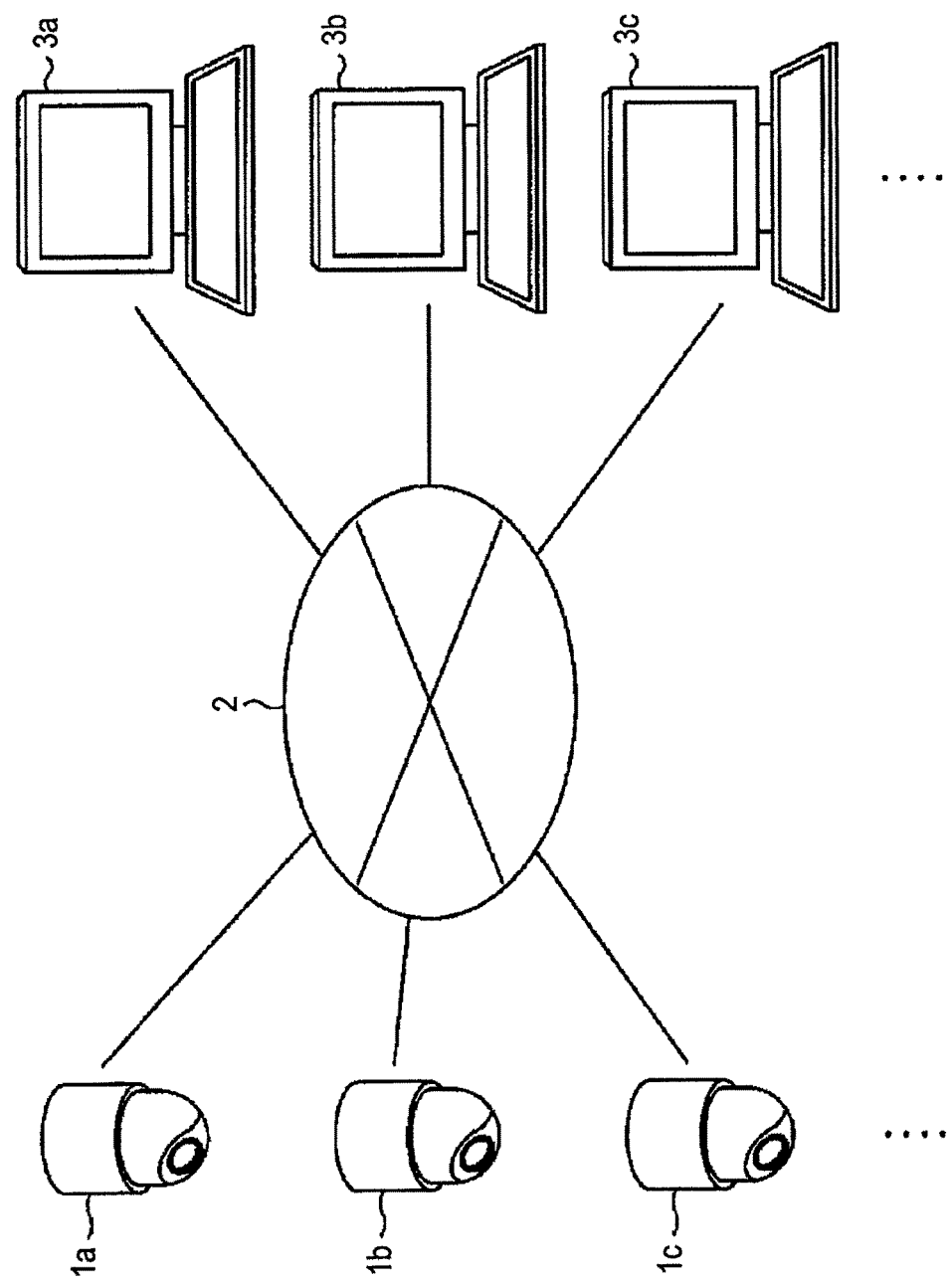

FIG.3A
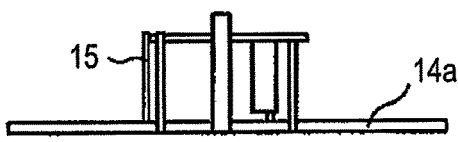
FIG.3B
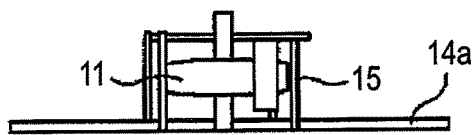
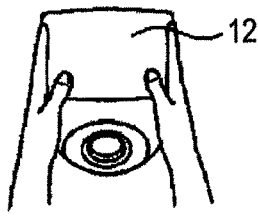
FIG.3C
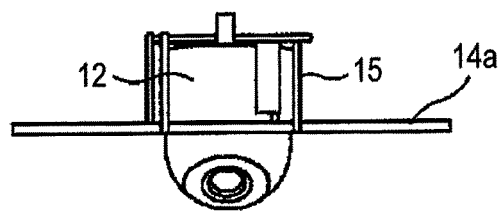
FIG.3D
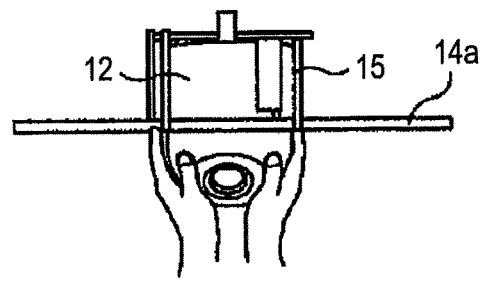

NETWORK CAMERA

This is a continuation of application Ser. No. 12/496,673, filed Jul. 2, 2009, which is entitled to the priority filing date of Japanese application 2008-179556, filed on Jul. 9, 2008, the entirety of which is incorporated herein by reference.

BACKGROUND OF THE INVENTION

1. Field of the Invention

The present invention relates to a network camera for transmitting a photographed image to a client terminal via a network.

2. Description of Related Art

It has been known that there is a technology for viewing an image sent from a network camera installed in a remote place via a network such as the Internet, or a network camera installed within a LAN (Local Area Network), on a screen of a terminal such as a personal computer or a mobile telephone.

A network camera that has a swivel base for swiveling an image sensor unit and is capable of such operations as pan and tilt by a remote operation has been widely available as a common produce in the market. Such a network camera having a swivel base offers great convenience to the user since, for example, it can control the angle of view for taking an image via a net work by swiveling the image sensor unit. It should be noted that such a camera having a swivel base is applied not only to the network camera but also to television systems such as the NTSC (National Television Standards Committee) television system.

In the camera having a swivel base, the swivel base driving unit is usually made up of many components, such as a motor and a speed reduction mechanism (such as gears and belts). These components generally tend to deteriorate more easily than electronic components, and they have predetermined service life. Therefore, periodic maintenance is necessary to use these components sustainably.

With a camera having many wiring cables, all the wiring cables need to be disconnected when removing the camera main unit from the mount base for maintenance, and the workload of the maintenance is considerable. In addition, the network camera having a swivel base is often used for surveillance, so in many cases, the system is not permitted to stop for a long time during maintenance. In particular, in the case where a large number of cameras are used at one location, the wiring cables of all the cameras need to be disconnected during maintenance, and when reinstalling the cameras back to the original locations, wiring needs to be done again. This requires a very large number of work hours.

In view of this, a camera furnished with a one-touch installation mechanism for attaching/detaching a camera main unit and a mount base with a single touch of a button, without cables, has become commonplace in recent years. Network cameras furnished with a one-touch installation mechanism have been widely used, for example, for surveillance.

In the camera furnished with the one-touch installation mechanism, a terminal or the like for connecting to an external device is provided at its mount metal fitting that serves as a base unit, for example, and further wiring cables are connected thereto. Then, the camera is fitted to a wall surface, a ceiling, or the like. The camera main unit is configured so as to be fitted to the mount metal fitting. The camera main unit and the base unit are connected by a connector. In addition, the camera has a mechanical retaining mechanism such as a lock button. The camera furnished with the one-touch installation mechanism with such a configuration can be installed and removed easily. (See, for example, JP-A-2005-26866.)

SUMMARY OF THE INVENTION

Such a camera furnished with the one-touch installation mechanism offers convenience to the worker who performs the installation and removal of the camera. However, such a network camera furnished with the one-touch installation mechanism has the following problem, for example.

Normally, each of the devices has an unique IP (Internet Protocol) address in a LAN that utilizes TCP/IP (Transmission Control Protocol/Internet Protocol). For example, in the case where IP addresses "192.168.100", "192.168.101", "192.168.102", "192.168.103", and "192.168.104" are assigned to network devices 31 to 35 connected to a network 30, respectively, as shown in FIG. 6, data can be transmitted to the network device 34 by specifying the IP address "192.168.103" in the network 30. Likewise, the network cameras, which are one type of network device, cannot be used if the IP address is not set precisely.

However, the IP address that is set for the network camera is stored in a memory furnished in the camera main unit, and therefore, setting of the IP address needs to be carried out again when a replacement network camera is installed during maintenance of a network camera, for example. Usually, it is difficult for one who does not have network administration knowledge to understand IP addresses. In addition, it takes a lot of effort even for one who possesses such knowledge to set the IP address every time the network camera is replaced. For this reason, the maintenance work efficiency has been low although the network camera has the one-touch replacement mechanism.

Thus, it is desirable to increase the efficiency of setting work of a network camera.

According to an embodiment of the invention, there is provided a network camera including a camera main unit including an image sensor unit and a movable portion having a motor for swiveling the image sensor unit, and a base unit, connected detachably to the camera main unit and fixed to a camera installation surface, the base unit having a nonvolatile memory for storing network operation information including network setting information unique to the network camera.

The network camera according to the embodiment of the invention makes it possible to inherit the network operation information to a replacement camera main unit by storing process information including the network setting information, such as IP addresses, in the memory provided in the base unit, even when the camera main unit is replaced with the replacement camera main unit. Such a network camera according to the embodiment of the invention makes it possible to increase the work efficiency when replacing the camera main unit with a replacement camera main unit, such as during maintenance.

BRIEF DESCRIPTION OF THE DRAWINGS

FIG. 1 is a schematic view illustrating the configuration of network cameras according to an embodiment of the invention.

FIGS. 3A to 3D are views illustrating an example of the configuration and an installation operation of a network camera according to an embodiment of the invention.

DESCRIPTION OF THE PREFERRED EMBODIMENTS

Figure 2A:
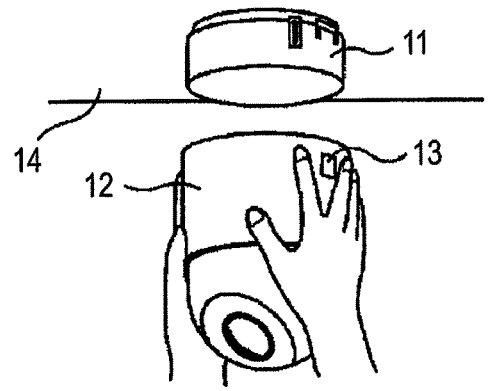
FIGS. 2A to 2D are views illustrating an example of the configuration and an installation operation of a network camera according to an embodiment of the invention.

Hereinbelow, specific embodiments of the invention will be described in detail with reference to the drawings.

As illustrated in FIG. 1, a network camera 1 (network cameras 1a, 1b, 1c, . . . ) according to this embodiment is connected to a client terminal 3 (client terminals 3a, 3b, 3c, . . . ) via a network 2, such as a LAN utilizing TCP/IP.

FIGS. 2A to 2D are views illustrating an example of the configuration and an installation operation of a network camera 1 according to an embodiment of the invention.

The network camera 1 is furnished with a swivel base (not shown) for swiveling a lens provided in a camera block by a motor. Therefore, the network camera 1 is made up of many components, such as a motor and a speed reduction mechanism (such as gears and belts). These components generally tend to deteriorate more easily than electronic components, and they have predetermined service life. Therefore, periodic maintenance is necessary. For this reason, the network camera 1 is furnished with a one-touch installation mechanism that allows it to be installed on a camera installation surface such as a ceiling or a wall surface with a single touch of a button, so that it can be attached to/detached from the camera installation surface with a simple operation during maintenance.

Figure 2B:
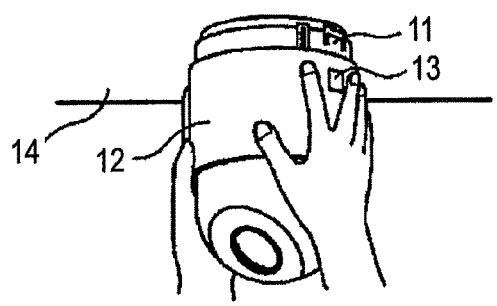
Figure 2C:
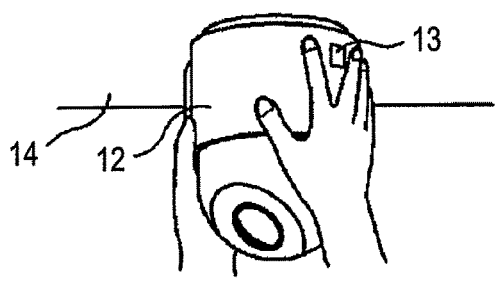
Figure 2D:
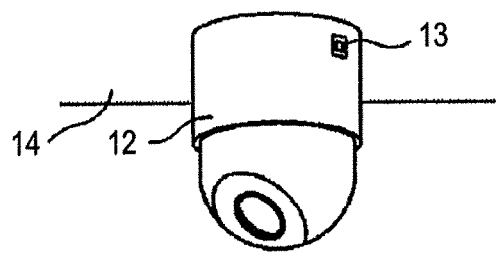

The network camera 1 shown in FIGS. 2A to 2D is furnished with a mount metal fitting 11, serving as a base unit, and a camera main unit 12. When the network camera 1 is installed on the camera installation face 14, such as a ceiling and a wall surface, the mount metal fitting 11 is fixed to the camera installation face 14 first, as shown in FIG. 2A, with the use of screws (not shown). Then, the marks (not shown) provided respectively on the mount metal fitting 11 and the camera main unit 12 are matched. Next, as shown in FIG. 2B, a wire (not shown) for preventing the camera from falling is fastened to the mount metal fitting 11, and thereafter, the camera main unit 12 is fitted to the mount metal fitting 11. This causes a fastening lock button 13 on a side face of the camera main unit 12 to protrude from the side face. Subsequently, as shown in FIG. 2C, the camera main unit 12 is fitted to the mount metal fitting 11 by pressing the knob of the fastening lock button 13. The network camera 1 is secured and installed to the camera installation face 14, as shown in FIG. 2D. The network camera 1 that has been installed by such a simple operation can be detached/attached even during maintenance by the simple operation of releasing the fastening lock button 13 and removing only the camera main unit 12, while the mount metal fitting 11 is kept as it is.

It should be noted that, as shown in FIGS. 3A to 3D, the network camera 1 may further be furnished with an embedding metal fitting 15 in addition to the mount metal fitting 11 and the camera main unit 12 so that it may be installed on a camera installation face 14a. When such a network camera 1 furnished with the embedding metal fitting 15 is installed onto the camera installation face 14, the embedding metal fitting 15 is embedded into the camera installation face 14a first, as shown in FIG. 3A. Next, as shown in FIG. 3B, the mount metal fitting 11 is fixed to the embedding metal fitting 15 with screws. Then, the marks provided respectively on the mount metal fitting 11 and the camera main unit 12 are matched. Next, as shown in FIG. 3C, the camera main unit 12 is fixed to the mount metal fitting 11, and an embedding ring (not shown) is fitted thereto. The network camera 1 is secured to the camera installation face 14a, as shown in FIG. 3D. The network camera 1 that has been installed by such a simple operation can be detached/attached even during maintenance by the simple operation of releasing a fastening lock (not shown) and removing only the camera main unit 12, while the mount metal fitting 11 is kept as it is.

Figure 4:
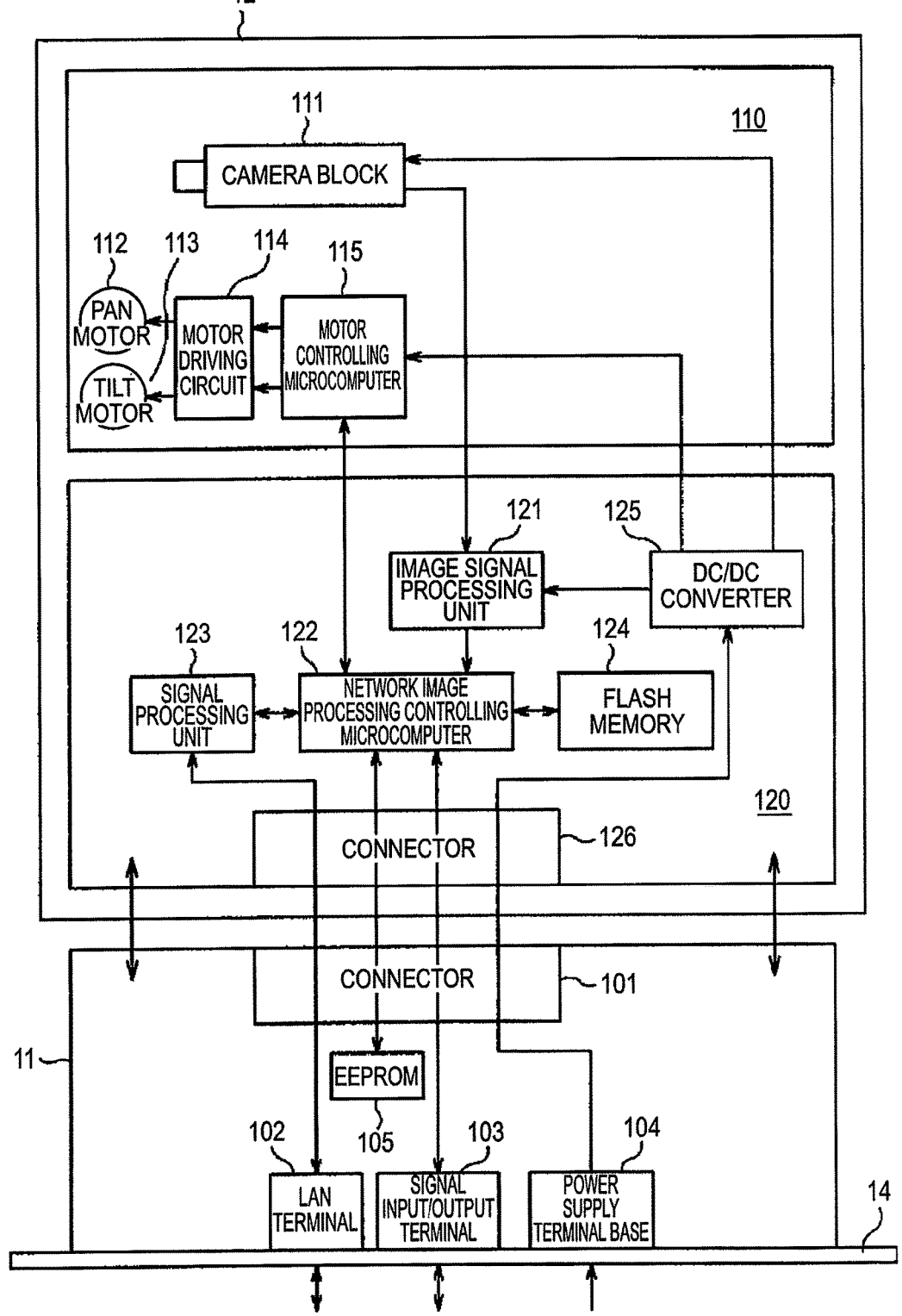
FIG. 4 is a diagram illustrating the internal structure of a network camera according to an embodiment of the invention.

FIG. 4 is a diagram illustrating the internal structure of the network camera 1. In the network camera 1, the mount metal fitting 11 and the camera main unit 12 are connected detachably to each other via the connector 101 and the connector 126.

The mount metal fitting 11 is a base unit for fitting the camera main unit 12 to the camera installation face 14, such as a ceiling or a wall surface. The mount metal fitting 11 is provided with a connector 101, a LAN terminal 102, a signal input/output terminal 103, a power supply terminal base 104, and an EEPROM (Electrically Erasable and Programmable Read Only Memory) 105, which is a nonvolatile memory. The connector 101 has connecting cables. By the connect cables, the connector 101 is connected to the LAN terminal 102, the signal input/output terminal 103, and the power supply terminal base 104.

The camera main unit 12 includes a movable portion 110 for moving an imaging direction and a stationary portion 120 for performing image signal processing for image signal and data transmission/reception via a network.

The movable portion 110 includes a camera block 111 as an image sensor unit, a pan motor 112, a tilt motor 113, a motor driving circuit 114, and a motor controlling microcomputer 115.

The stationary portion 120 includes an image signal processing unit 121, a network image processing controlling microcomputer 122, a signal processing unit 123, a flash memory 124, a DC/DC converter 125, and a connector 126.

The camera block 111 as the image sensor unit, provided in the movable portion 110, includes an interline type CCD (Charge Coupled Devices) image sensor (not shown) and a timing generator (not shown) for operating the interline type CCD image sensor.

In the camera block 111, the interline type CCD image sensor causes the light from a photographic subject to form an image on a light-receiving plane of an image sensor element by an optical system (not shown) such as a lens so as to carry out photoelectric conversion at a field cycle, and it outputs an interlace output, i.e., to output an image output of an odd-numbered field and an image output of an even-numbered field, which constitute one frame, alternately. The interline type CCD image sensor outputs analog image signals sequentially as the image outputs of the respective fields. Here, the camera block 111 sets a motion detection mode for the photographic subject by later-described motion detection setting information and performs the above-described imaging process.

The image signal processing unit 121 provided in the stationary portion 120 samples and holds the analog image signal from the interline type CCD image sensor and performs A/D (Analog to Digital) conversion. The image signal processing unit 121 performs a compression process for the obtained digital image signal thus obtained by a codec or the like, to generate compressed image data compliant to, for example, the JPEG (Joint Photographic Experts Group) standard format. The image signal processing unit 121 performs such image processing using later-described various types of image output function information.

The flash memory 124 stores a control program for controlling a series of signal processing operations in the network camera 1. The network image processing controlling microcomputer 122 reads out the control program stored in the flash memory 124 and executes a series of signal processing operations including the following signal processing.

The network image processing controlling microcomputer 122 supplies the compressed image data generated by the image signal processing unit 121 to the signal processing unit 123 according to a protocol such as TCP/IP (Transmission Control Protocol/Internet Protocol). In addition, the network image processing controlling microcomputer 122 causes the flash memory 124 to store the compressed image data.

The signal processing unit 123 performs signal processing to the signal supplied from the network image processing controlling microcomputer 122 so as to transmit the signal to Ethernet (registered trademark) standardized by IEEE (The Institute of Electrical and Electronics Engineers, Inc.) 802.3u. Thereafter, the processed signal is transmitted to the network 2 via the connectors 126, 101, and the LAN terminal 102.

In addition, the signal processing unit 123 supplies data of the later-described network camera information and various types of commands, which are received from the network 2 via the LAN terminal 102 and the connectors 101 and 126, to the network image processing controlling microcomputer 122.

The network image processing controlling microcomputer 122 supplies the network camera information supplied from the signal processing unit 123 to the EEPROM 105 via the connectors 126 and 101. The network camera information includes network operation information necessary for the network camera 1 on the network 2, motion detection setting information used in an image taking process, and swivel base setting information for swiveling the camera block 111. An example of the network operation information may be network setting information including, for example, an IP address unique to the network camera 1.

Also, the network image processing controlling microcomputer 122 supplies a command supplied from the signal processing unit 123 to a block that is the subject of the command. For example, when receiving a movable portion operating command for moving the movable portion 110 from the client terminal 3 via the network 2, the network image processing controlling microcomputer 122 transmits the movable portion operating command to the motor controlling microcomputer 115 and it instructs the motor controlling microcomputer 115 to control the driving of the pan motor 112 and the tilt motor 113 by the motor driving circuit 114.

The motor controlling microcomputer 115 supplies data according to the movable portion operating command supplied from the network image processing controlling microcomputer 122 to the motor driving circuit 114, to control the motor drive operations of the motor driving circuit 114.

The motor driving circuit 114 supplies a drive current to the pan motor 112 and the tilt motor 113 to drive the pan motor 112 and the tilt motor 113. It should be noted that when step motors are used for the pan motor 112 and the tilt motor 113, drive pulses corresponding to the rotation speed of the motors are applied to the pan motor 112 and the tilt motor 113. The rotation shafts of the pan motor 112 and the tilt motor 113 are fixed to the swivel base, and the swivel base causes the camera block 111, an image sensor unit having a lens, to rotate by a predetermined angle in a pan direction or a tilt direction.

A power supply cable from a power source installed in the camera installation face 14 is connected to the power supply terminal base 104. The power supply terminal base 104 supplies a power output of DC 12 V or AC 24 V to the DC/DC converter.

The DC/DC converter 125 adjusts a voltage of power output of DC 12 V or AC 24 V supplied from the power supply terminal base 104 to a low voltage power output of DC 12 V, or the like. The DC/DC converter 125 supplies the low voltage power output to the image signal processing unit 121, the motor controlling microcomputer 115, and the camera block 111.

Various types of network camera information are stored in the EEPROM 105. An example of the network camera information is an IP address unique to the network camera 1. This IP address is set by a client terminal that administers the network camera 1.

Even when the camera main unit 12 is replaced, the network camera 1 can inherit the network camera information to the replaced network camera by storing the network camera information in the EEPROM 105 provided in the mount metal fitting 11.

Examples of the network camera information include network operation information, motion detection setting information, and swivel base setting information, such as the following.

(1) Network Operation Information (Web Server Function)
(1-1) Image Output Function Information in the Image Signal Processing Unit 121
   Codec operation selection
   Image size (VGA, QVGA, or QQVGA)
   Digital zoom function (for example, 12×)
   Compression ratio (for example, each codec: 5 steps)
(1-2) Alarm Setting Information
   Process to be performed at the time of alarm (mail service, FTP (File Transfer Protocol) service, image recording, etc.)
   Alarm output (Specifying ON/OFF etc.)
   Time alarm
(1-3) User Setting Information
   Administrator ID, password
   User ID, password, access level
(1-4) Network Setting Information
   Enable/disable DHCP (Dynamic Host Configuration Protocol) setting
   IP address
   Netmask setting
   Gateway setting
   DNS (Domain Name System) server setting
(1-5) SMTP Setting Information
   SMTP (Simple Mail Transfer Protocol) server specified
   Destination address
   Subject
   Text content
   Attached image specified
(1-6) FTP Client Setting Information
   FTP server (Host name, user ID, password)
   Transfer interval
   Setting of operation event (timer, alarm, motion detection)
   System upgrade setting FTP server for storing the upgraded program
Security setting
IP filtering setting
FTP server setting
User account setting, access privilege setting (2) Motion Detection Setting Information in the Camera Block 111
Setting of photographic subject detection mode (for example, moving subject/non-moving subject)
Setting of detection frame
Setting of masking frame
Setting of the size of the detection subject
Setting of detection sensitivity (3) Swivel Base Setting Information
Operation mode setting
Operation speed setting in each mode
Setting of present functions, etc. (e.g., the direction of the swivel base, camera zoom lens position)

In this way, the network camera 1 is configured so that the camera main unit 12 can be easily attached to and detach from the mount metal fitting 11, serving as the base unit, via the connectors 126 and 101. In addition, even when the camera main unit 12 is replaced with a replacement camera main unit, the network camera 1 can inherit the network camera information, such as IP addresses, to the replaced camera main unit because the network camera information is stored in the EEPROM 105 provided in the mount metal fitting 11. Such a network camera makes it possible to increase the work efficiency when replacing the camera main unit with a replacement camera main unit, such as during maintenance of the network camera 1.

Figure 5:
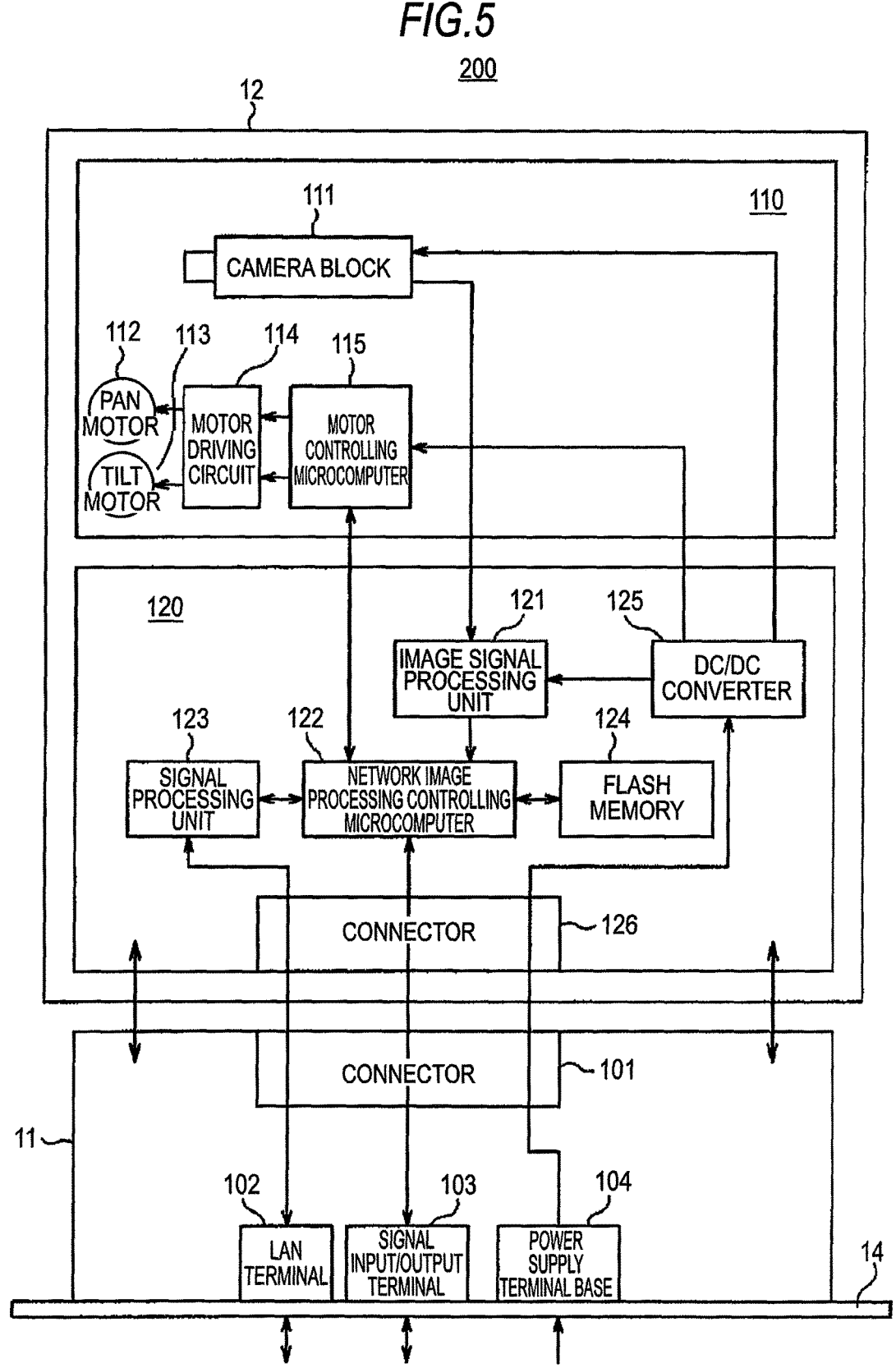
FIG. 5 is a diagram illustrating the configuration of a network camera in related art.
Figure 6:
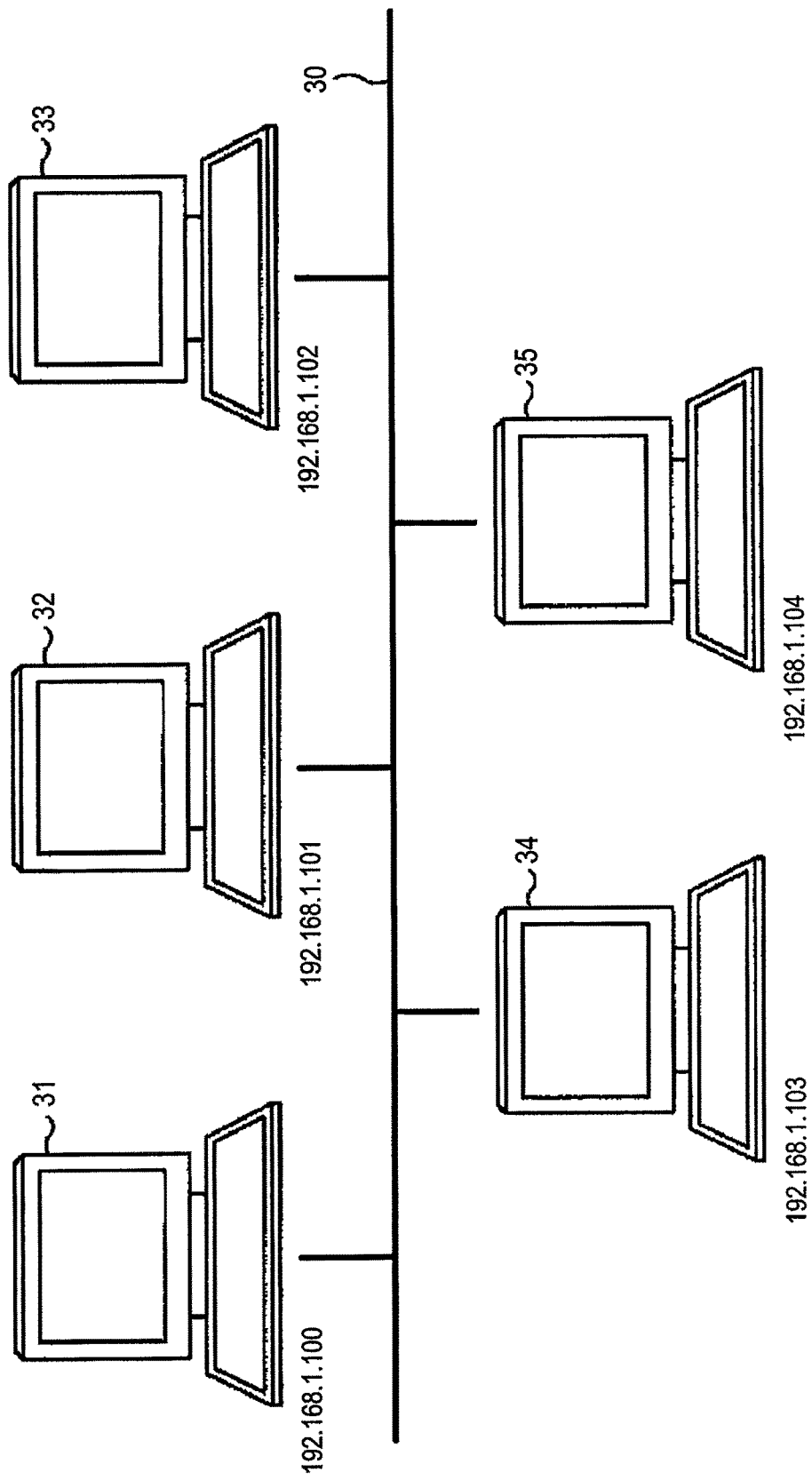
FIG. 6 is a schematic view illustrating a plurality of client terminals connected to a network.

On the other hand, a related art network camera has the structure as shown in FIG. 5, for example. Here, the same component parts as those of the network camera 1 of this embodiment are designated by the same reference numerals, and the explanations thereof will be omitted. A related art network camera 200 stores network camera information such as IP addresses in a flash memory 124 provided in a camera main unit 12. In such a related art network camera, the camera main unit 12 possesses the network camera information, so the network camera information needs to set again when the camera main unit 12 is replaced with another camera main unit, for example, during maintenance. The network camera 1 can resolve all such problems in the related art network camera and can increase the efficiency in the maintenance work.

It may appear possible to design the network camera according to this embodiment so that the electronic circuits such as the image processing microcomputer to be incorporated in the mount metal fitting, which is the base unit. In this case, the network camera requires maintenance only for the failures of the mechanical structures, so it may seem to offer a great degree of convenience. However, when performing maintenance for the failures in the electronic circuit, the mount metal fitting serving as the base unit needs to be replaced. Therefore, it is inappropriate to configure the network camera to have a one-touch installation mechanism by a connector joint.

In contrast, the network camera 1 according to this embodiment encloses all the electronic circuits and mechanical structures in the camera main unit 12, and encloses the EEPROM 105, which is a nonvolatile memory, in the mount metal fitting 11. Thereby, the network camera 1 is allowed to have one-touch replacement mechanism so that the camera main unit 12 can be removed with a simple operation. As a result, the work efficiency of the maintenance for the failures in the electronic circuits can be increased. Actually, the failure rate of a nonvolatile memory such as the EEPROM 105 per one unit is very low. For this reason, it is unnecessary for the network camera 1 to remove the mount metal fitting 11 and perform maintenance for the EEPROM 105, so maintenance can be performed efficiently with a simple operation.

It should be noted that the invention is not limited to the foregoing embodiments, but various modifications are of course possible without departing from the scope of the invention.

The present application contains subject matter related to that disclosed in Japanese Priority Patent Application JP 2008-179556 filed in the Japan Patent Office on Jul. 9, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A network camera adapted for communication in a network and having a network address, the camera comprising:
   a camera main unit including (a) a movable portion having an image sensor unit, a motor for swiveling the image sensor unit, and a motor driving circuit for driving the motor, and (b) a stationary portion having an image signal processing unit, a network image processing controlling unit, and a signal processing unit, the camera main unit being replaceable; and
   a base unit to which the camera main unit is detachably received, the base unit having a nonvolatile memory for storing the network address and network operation information including network setting information unique to the network camera for operating the network camera or a replacement camera main unit received by the base unit, the base unit including motion detection setting information for setting a motion detection mode for the image sensor unit for a subject imaged by the image sensor unit, wherein the base unit has no image sensor unit, no motor driving circuit, and no image signal processing unit,
   wherein the motion detection setting information is used in both the camera main unit and a replacement camera main unit, and
   wherein the replacement camera main unit is used in the network camera as a replacement of the camera main unit with the network address of the network camera.

2. The network camera of claim 1, wherein the network address is an Internet Protocol (IP) address.

3. The network camera of claim 2, wherein
   the image signal processing unit performs predetermined image processing for an image signal generated by the image sensor unit to generate compressed image data; and
   the nonvolatile memory stores, as the network operation information, image output function information used for the image processing performed by the image signal processing unit.

4. The network camera of claim 3, wherein the motor includes a pan motor for swiveling the image sensor unit in a pan direction and a tilt motor for swiveling the image sensor unit in a tilt direction.

* * * * *